(12) United States Patent
Oda

(10) Patent No.: US 9,709,419 B2
(45) Date of Patent: Jul. 18, 2017

(54) INFORMATION PROCESSING DEVICE AND INFORMATION PROCESSING METHOD

(71) Applicant: CLARION CO., LTD., Saitama (JP)

(72) Inventor: Isamu Oda, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/035,266

(22) PCT Filed: Sep. 19, 2014

(86) PCT No.: PCT/JP2014/074852
§ 371 (c)(1),
(2) Date: May 9, 2016

(87) PCT Pub. No.: WO2015/068477
PCT Pub. Date: May 14, 2015

(65) Prior Publication Data
US 2016/0273935 A1    Sep. 22, 2016

(30) Foreign Application Priority Data
Nov. 11, 2013   (JP) .................................. 2013-233007

(51) Int. Cl.
*G01C 21/36*   (2006.01)
*G01C 21/32*   (2006.01)

(52) U.S. Cl.
CPC ......... *G01C 21/3667* (2013.01); *G01C 21/32* (2013.01); *G01C 21/36* (2013.01)

(58) Field of Classification Search
CPC ..... G01C 21/3667; G01C 21/36; G01C 21/32
See application file for complete search history.

(56) References Cited

U.S. PATENT DOCUMENTS 4,608,656 A * 8/1986 Tanaka ............... G01C 21/3667
                                                          340/988
9,285,238 B2 * 3/2016 Nogawa ................. G01C 21/30
(Continued)

FOREIGN PATENT DOCUMENTS

CN      102788586 A  * 11/2012
JP      2006-18086 A    1/2006
(Continued)

OTHER PUBLICATIONS

Mikuriya et al., JP2012037799, Feb. 23, 2012 (Machine Translation).*
(Continued)

*Primary Examiner* — Courtney Heinle
(74) *Attorney, Agent, or Firm* — IP Business Solutions, LLC

(57) ABSTRACT

To make it possible to accurately inform a user of a road that has become usable. A navigation device 1 includes a storing unit 10 that stores information concerning a map including unopened roads, a processing unit 12 that performs display of the map or a search for a route or the display of the map and the search for a route on the basis of the information concerning the map stored by the storing unit 10, and an acquiring unit 11 that acquires an opening situation of a road. The storing unit 10 stores, separately from the information concerning the map, the opening situation of the road acquired by the acquiring unit 11. The processing unit 12 performs the display of the map or the search for a route or the display of the map and the search for a route on the basis of the information stored by the storing unit.

8 Claims, 10 Drawing Sheets

(56) References Cited

U.S. PATENT DOCUMENTS

| | | | | |
|---|---|---|---|---|
| 2006/0235739 A1* | 10/2006 | Levis | ............... | G06Q 10/08 |
| | | | | 705/1.1 |
| 2007/0124064 A1* | 5/2007 | Fukui | ............... | G01C 21/32 |
| | | | | 701/532 |
| 2010/0004855 A1* | 1/2010 | Liao | ............... | G01C 21/32 |
| | | | | 701/532 |
| 2010/0131193 A1* | 5/2010 | Shnyr | ............... | G01C 21/32 |
| | | | | 701/532 |
| 2016/0091324 A1* | 3/2016 | Horihata | ............ | G08G 1/0112 |
| | | | | 701/417 |

FOREIGN PATENT DOCUMENTS

| | | |
|---|---|---|
| JP | 2010-8344 A | 1/2010 |
| JP | 2012-37443 A | 2/2012 |
| JP | 2012-37798 A | 2/2012 |
| JP | 2012-37799 A | 2/2012 |
| JP | 5404557 B2 * | 2/2014 |

OTHER PUBLICATIONS

Sako, JP2006018086, Jan. 19, 2006 (Machine Translation).*
International Search Report issued for corresponding PCT/JP2014/074852 application.
Written Opinion of the International Search Authority issued for corresponding PCT/JP2014/074852 application.
International Preliminary Report on Patentability issued for corresponding PCT/JP2014/074852 application.

* cited by examiner

FIG.3

| ROAD NUMBER | LINK INFORMATION | |
|---|---|---|
| # | MESH ID1 | LINK 1 |
| | | LINK 2 |
| | | ... |
| | | LINK 10 |
| | MESH ID2 | LINK 1 |
| | | LINK 2 |
| | | ... |
| # | | LINK 5 |
| | MESH ID10 | LINK 1 |
| | | LINK 2 |
| | | ... |
| | | LINK 5 |
| | MESH ID20 | LINK 21 |
| | | LINK 22 |
| | | ... |
| | | LINK 30 |
| ... | | |

25: ROAD NUMBER
22: LINK INFORMATION
16: REFERENCE TABLE

FIG.9

117: OPENING SITUATION FILE (FILE NAME: AAA.dat)

| ROAD NUMBER | ROAD NAME | OPENING SITUATION | OPENING SCHEDULED DATE |
|---|---|---|---|
| 000001 | AAA EXPRESSWAY | OPENED | 2014/1/1 |
| 000012 | BBB EXPRESSWAY | OPENED | 2014/1/10 |
| 000123 | CCC EXPRESSWAY | OPENED | 2014/1/20 |
| 001001 | XXX EXPRESSWAY | OPENED | 2014/2/1 |
| 010001 | YYY EXPRESSWAY | OPENED | 2014/2/10 |
| 100001 | ZZZ EXPRESSWAY | UNOPENED | 2014/2/20 |

Rows 1–3: DISTRIBUTED LAST TIME
Rows 4–6: DISTRIBUTED THIS TIME

FIG.10

117: OPENING SITUATION FILE

| ROAD NUMBER | ROAD NAME | OPENING SITUATION |
|---|---|---|
| 000001 | AAA EXPRESSWAY | OPENED |
| 000012 | BBB EXPRESSWAY | OPENED |
| 000123 | CCC EXPRESSWAY | OPENED |
| 001001 | XXX EXPRESSWAY | OPENED |
| 010001 | YYY EXPRESSWAY | OPENED |

25 — ROAD NUMBER
26 — ROAD NAME
62 — OPENING SITUATION

Rows 1–3: DISTRIBUTED LAST TIME
Rows 4–5: DISTRIBUTED THIS TIME

INFORMATION PROCESSING DEVICE AND INFORMATION PROCESSING METHOD

TECHNICAL FIELD

The present invention relates to an information processing device and an information processing method.

BACKGROUND ART

As background art in this technical field, there is Japanese Patent Application Laid-Open No. 2010-8344 (Patent Literature 1). This publication contains the following description: "Opening information is acquired from the outside by the acquiring unit 103. When the opening information is acquired, in map data including usable roads and unopened roads stored in the storing unit 101, an unopened road corresponding to the opening information is changed to a usable road by the changing unit 104. A note of un-usability corresponding to the changed road may be changed to a note of usability.

Subsequently, predetermined processing such as map display processing for causing the display unit 102 to display a map including the usable roads, route search processing for searching for a route targeting the usable roads, and expressway-facility-information display processing for causing the display unit 102 to display information concerning usable expressway facilities is executed by the processing unit 105 using the usable roads without using the unopened roads."

CITATION LIST

Patent Literature

Patent Literature 1: Japanese Patent Application Laid-Open No. 2010-8344

SUMMARY OF INVENTION

Technical Problem

However, in Patent Literature 1, when the opening information is acquired from the outside, a change of the map data stored in the storing unit is performed. Therefore, the processing unit cannot use the map data while the change is performed. Therefore, there is a problem in that, although a road is opened, it is impossible to inform a user to that effect.

According to the change for making the unopened road usable, there is also a concern about damage to the map data.

Therefore, it is an object of the present invention to provide an information processing device and an information processing method that can accurately inform a user of a road that has become usable.

Solution to Problem

The entire contents of Japanese Patent Application No. 2013-233007 filed on Nov. 11, 2013 are included in this specification.

In order to attain the object, the present invention provides an information processing device including: a storing unit that stores information concerning a map including unopened roads; a processing unit that performs display of the map or a search for a route or the display of the map and the search for a route on the basis of the information concerning the map stored by the storing unit; and an acquiring unit that acquires an opening situation of a road. The storing unit stores, separately from the information concerning the map, the opening situation of the road acquired by the acquiring unit. The processing unit performs the display of the map or the search for a route or the display of the map and the search for a route on the basis of the information stored by the storing unit.

Advantageous Effects of Invention

According to the present invention, it is possible to accurately inform a user of a road that has become usable.

BRIEF DESCRIPTION OF DRAWINGS

FIG. 3 is an explanatory diagram of a reference table.

FIG. 9 is a schematic diagram of an opening situation file.

FIG. 10 is a schematic diagram showing a modification of the opening situation file.

DESCRIPTION OF EMBODIMENTS

Figure 1:
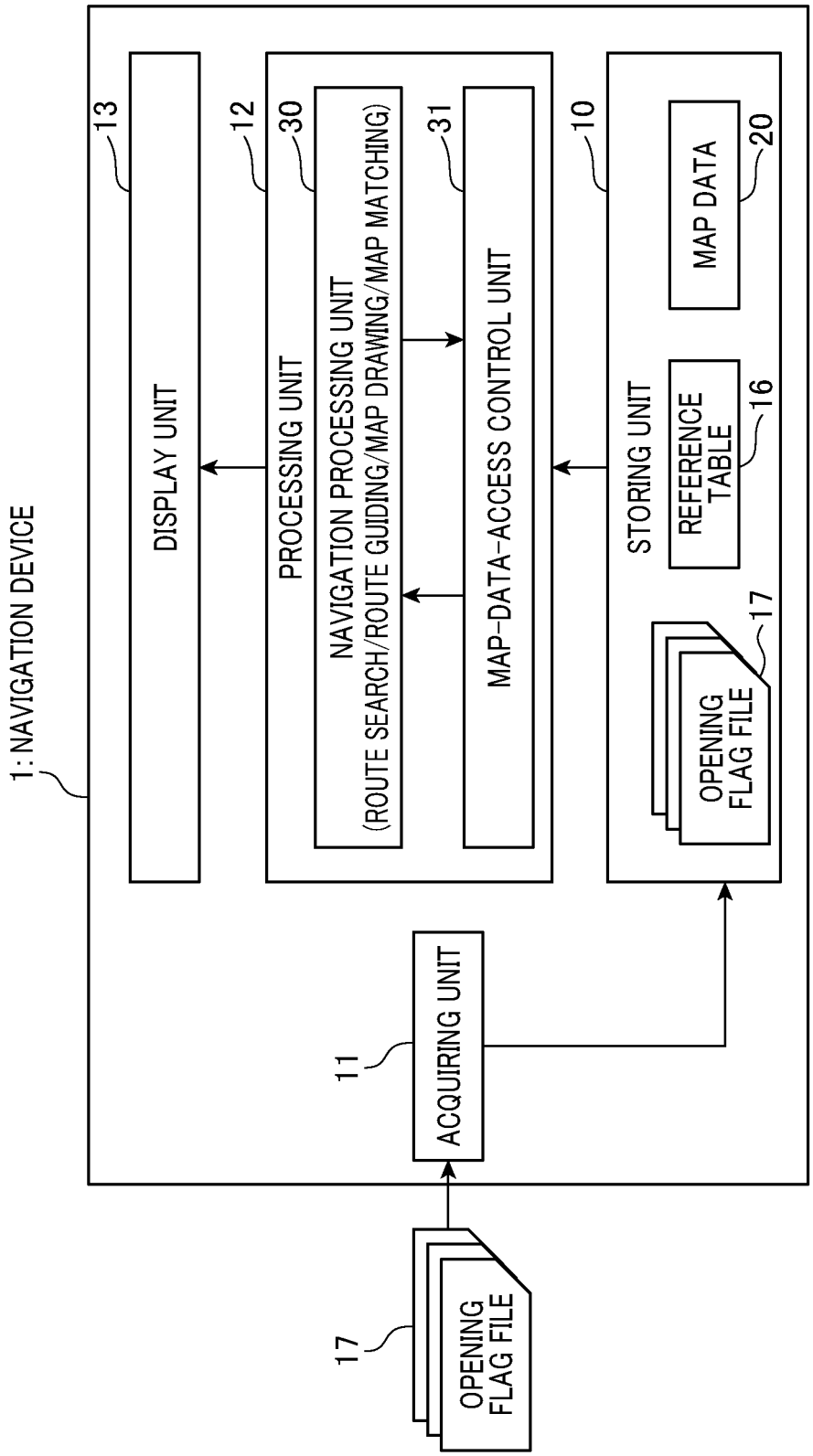
FIG. 1 is a functional block diagram showing the configuration of a navigation device according to an embodiment of the present invention.

FIG. 1 is a functional block diagram showing the configuration of a navigation device 1 according to an embodiment.

The navigation device 1 is a device including at least a function of displaying a map, searching for a route leading from the present point or a user-selected point to a destination, and performing guidance while showing the route on the map. As shown in the figure, the navigation device 1 includes a storing unit 10, an acquiring unit 11, a processing unit 12, and a display unit 13. The navigation device 1 is configured as, for example, a vehicle-mounted device such as a car navigation device or a portable device such as a portable navigation device.

The storing unit 10 stores map data 20, a reference table 16, and an opening flag file 17. The storing unit 10 includes any storage device such as a hard disk or a memory device for storing the map data 20, the reference table 16, and the opening flag file 17.

Figure 2:
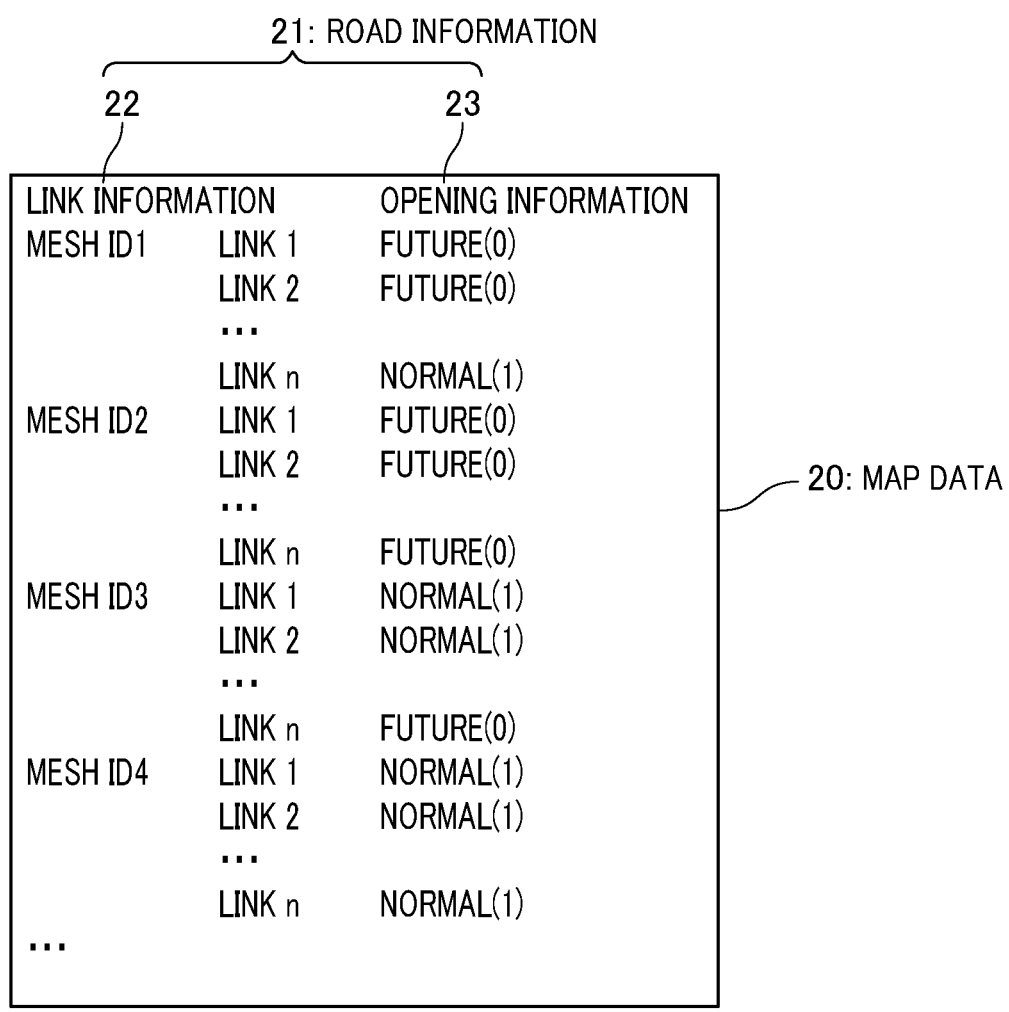
FIG. 2 is an explanatory diagram of map data.

FIG. 2 is an explanatory diagram of the map data 20.

As shown in FIG. 2, the map data 20 is data including information concerning a map including at least information concerning roads (hereinafter referred to as "road information 21"). The road information 21 includes at least link information 22 and opening information 23. The link information 22 is information concerning a link that connects nodes indicating branch points (e.g., crossings) of roads. In the map data 20, the link information 22 is registered as information in which IDs are attached to links included in meshes. The meshes indicate a ground surface divided into a large number of squares or the like. A standardized version of the meshes is called standard regional meshes.

The opening information 23 is information for distinguishing opening/un-opening of roads in the map data 20.

That is, in the map data 20, respective kinds of the road information 21 of roads opened at a point in time of creation of the map data 20 and unopened roads (under construction or scheduled to be constructed) scheduled to be opened in future thereafter are included. The opening information 23 is attached to the road information 21 of all of these roads. The unopened roads are distinguished on the basis of the opening information 23.

In the map data 20, the road information 21 is associated with each of the links configuring the roads. When the link is the unopened road, a value "0" is stored in the road information 21. When the link is the opened road, a value "1" is stored in the road information 21. Note that, in an example shown in FIG. 2, in order to facilitate a grasp of meanings of the values of the road information 21, for convenience, the values are shown with characters "future" attached to the value "0" of the road information 21 and with characters "normal" attached to the value "1" of the road information 21.

FIG. 3 is an explanatory diagram of the reference table 16.

In general, in a map converted into data, road numbers 25 are attached to all roads in route units. Correspondence between the road numbers 25 of the routes and links configuring the routes is defined in the reference table 16. Specifically, in the reference table 16, as shown in FIG. 3, the link information 22 explained above is recorded in association with each of the road numbers 25. The navigation device 1 can specify the road number 25 of a route including certain link information 22 by referring to the reference table 16.

Figure 4:
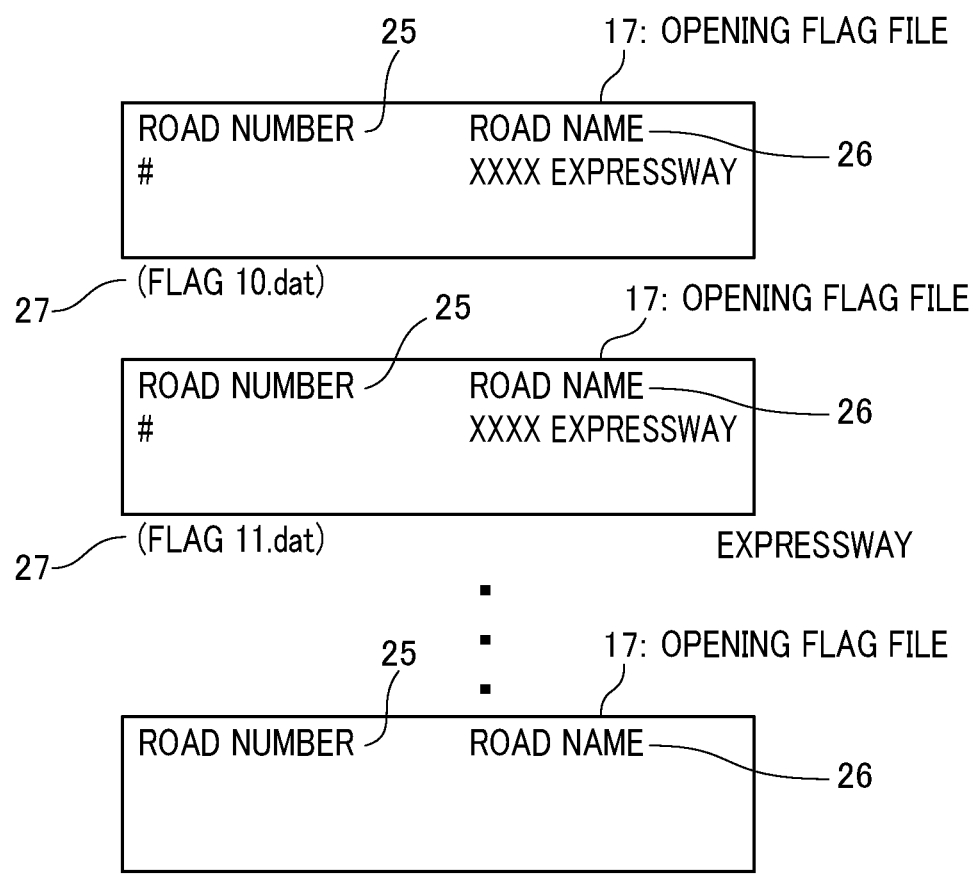
FIG. 4 is an explanatory diagram of an opening flag file.

FIG. 4 is an explanatory diagram of the opening flag file 17.

The opening flag file 17 shows information indicating an actual opening situation of a road. In this embodiment, the opening flag file 17 includes information indicating a route opened anew from an unopened state. Specifically, in the opening flag file 17, as shown in FIG. 4, the road number 25 of the route opened anew and a road name 26 indicating a name of the route are recorded in association with each other. The opening flag file 17 is generated for each one route, that is, one road number 25. The opening flag file 17 and the route opened anew are associated with each other in a one-to-one relation. That is, every time a certain route is opened, the opening flag file 17 indicating the opening of the route is stored in the storing unit 10. In other words, the opening of the route is identified by the presence of the opening flag file 17. It is unnecessary to rewrite the opening information 23 of the map data 20.

Therefore, in the navigation device 1, it is unnecessary to change the map data 20 according to processing for opening an unopened road. Therefore, it is possible to avoid a situation in which the map data 20 cannot be used for the processing while the change is performed. Since the change of the map data 20 is unnecessary, there is no concern about damage to the map data 20 either. Further, when a road once opened is unopened because of some reason, in the navigation device 1, the road can be returned to the unopened state simply by deleting the opening flag file 17 of the road. Therefore, maintenance is extremely easy.

When the navigation device 1 is configured to change the map data 20 every time a road is opened, it is conceivable to duplicate the map data 20 in preparation for damage in an unlikely event. However, such processing is unnecessary. Further, it is unnecessary to increase the capacity of the storing unit 10 for the duplication of the map data 20.

Referring back to FIG. 1, the acquiring unit 11 acquires the opening flag file 17 from the outside of the navigation device 1 and stores the opening flag file 17 in the storing unit 10. Specifically, the opening flag file 17 is distributed from a distribution server such as a map center 40 (FIG. 6), which manages opening of roads, through any electric communication line such as the Internet or recorded in a recording medium such as an optical disk or a semiconductor memory and copied to the navigation device 1. The acquiring unit 11 includes a communication device connected to the electric communication line or a reading device that reads the recording medium. The acquiring unit 11 acquires the opening flag file 17 with the communication device or the reading device and stores the opening flag file 17 in the storing unit 10. When storing the opening flag file 17 in the storing unit 10, the acquiring unit 11 attaches a file name 27 (see FIG. 4), with which the file can be uniquely identified, to the opening flag file 17 to prevent the stored opening flag file 17 from being, so to speak, overwritten and updated.

Since the opening flag file 17 is individually stored in the storing unit 10 for each of actually opened roads, the opened road and the opening flag file 17 are associated with each other in a one-to-one direction in the map data 20. Consequently, when an opened road is cancelled and returned to unopened in the map data 20, by deleting the opening flag file 17 associated with the road, it is possible to independently return the road to unopened without affecting opening of other roads.

When opening of a road is cancelled and the road is unopened, the navigation device 1 only has to delete the opening flag file 17. Therefore, it is unnecessary to receive information from the outside such as the map center 40. For example, the navigation device 1 may be configured to enable the opening flag file 17 to be deleted on the basis of operation by a user.

The processing unit 12 executes various kinds of processing. The processing unit 12 includes a navigation processing unit 30 and a map-data-access control unit 31. The processing unit 12 includes a storage device such as a semiconductor memory that stores a program and an arithmetic device such as a CPU or an MPU that executes the program. Functions of the navigation processing unit 30 and the map-data-access control unit 31 included in the processing unit 12 are realized by the arithmetic device executing the program stored in the storage device. Functions of the processing unit 12 can be optionally changed and added according to a change of the program or addition of programs.

The navigation processing unit 30 executes processing concerning navigation based on the map data 20. For example, route search processing, route guiding processing, map drawing processing, and map matching processing are included in the processing. The route search processing is processing for searching for a route from a set point to a destination on the basis of the link information 22 of the map data 20. The route guiding processing is processing for presenting, on a map, a traveling direction, a distance, and the like to the destination on the basis of the present point and guiding the user to the destination. The map drawing processing is processing for displaying a map (roads, facilities, etc.) on the basis of the map data 20. The map matching processing is processing for correcting, on the basis of the map data 20, errors in latitude/longitude information of the present point positioned by a not-shown positioning device such as a GPS.

The map-data-access control unit 31 determines whether an unopened road referred on in the processing by the navigation processing unit 30 is already opened.

Specifically, among the various kinds of processing executed by the navigation processing unit 30, in the processing such as the route search processing and the route guiding processing, it is necessary to exclude unopened roads such that routes including the unopened roads are not used (processing for excluding the unopened roads is hereinafter referred to as "unopened road avoidance processing").

Therefore, when the road information 21 referred to during the execution of the unopened road avoidance processing includes the link information 22 of unopening, the navigation processing unit 30 inquires the map-data-access control unit 31 about opening of a road of the link information 22 and receives a result of the inquiry. When the road is not opened, the navigation processing unit 30 advances the processing using only opened roads excluding the road information 21 of the inquired link information 22.

Note that, as explained above, whether the link information 22 referred to by the navigation processing unit 30 indicates unopening is determined according to whether the opening information 23 recorded in association with the link information 22 in advance is "0" (future) or "1" (normal). In the following explanation, the inquiry about whether the road of the link information 22 is opened is referred to as "opening situation check request". Naturally, the navigation device 1 may perform the opening situation check request not only during the unopened road avoidance processing but also in other processing as appropriate.

The map-data-access control unit 31 determines according to the opening situation check request for the link information 22 whether the road of the link information 22 is opened and returns a result to the navigation processing unit 30. The determination concerning whether the road of the link information 22 is opened is performed on the basis of the reference table 16 and the opening flag file 17. Specifically, the map-data-access control unit 31 specifies, on the basis of the reference table 16, the road number 25 of the road corresponding to the link information 22 for which the opening situation check is requested and determines whether the opening flag file 17 including the road number 25 is present in the storing unit 10. As explained above, the opening flag file 17 is stored in the storing unit 10 on the basis of distribution information from the map center 40 when the road is actually opened. Therefore, when the opening flag file 17 with the road number 25 related to the inquiry is present, since the road of the road number 25 is opened, the map-data-access control unit 31 replies to the navigation processing unit 30 to the effect that the link information 22 is "opened". On the other hand, when the opening flag file 17 is absent, the map-data-access control unit 31 replies to the navigation processing unit 30 to the effect that the link information 22 is "unopened".

The display unit 13 displays a map, a menu, and the like required for navigation on the basis of a processing result of the navigation processing unit 30. The display unit 13 includes any display device such as a flat panel display device. Note that the display unit 13 does not need to be integrally included in the navigation device 1. The display unit 13 may be a display device separate from the navigation device 1 or detachably provided in a main body of the navigation device 1. When the navigation device 1 transmits display data, which should be displayed on the display unit 13, to another device by wire or radio and causes a display device included in the other device to display the display data, the display device may be used as the display unit 13.

Note that the navigation device 1 includes, besides the units shown in FIG. 1, a positioning device such as a GPS or a gyro sensor that measures the present position, a device for operation such as an operator or a touch panel for inputting operation by the user, and other various devices included in a general navigation device.

Figure 5:
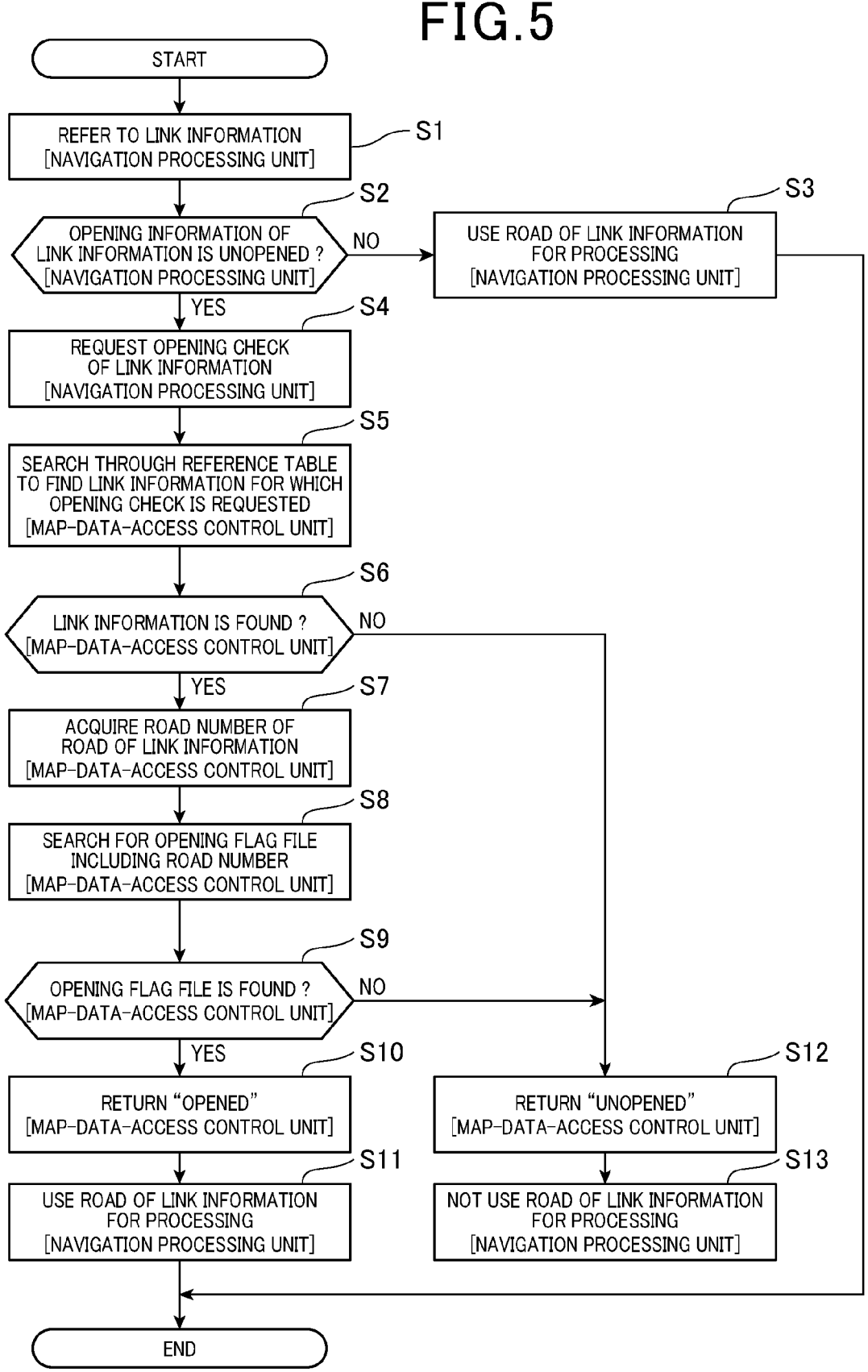
FIG. 5 is a flowchart showing the operation of a processing unit in unopened road avoidance processing.

FIG. 5 is a flowchart for explaining the operation of the processing unit 12 in the unopened road avoidance processing.

During the execution of the unopened road avoidance processing, as explained above, the processing is performed using only the opened roads excluding the unopened roads. Therefore, the navigation processing unit 30 of the processing unit 12 executes processing explained below. That is, as shown in FIG. 5, every time the navigation processing unit 30 refers to the link information 22 of the road information 21 (step S1), the navigation processing unit 30 determines on the basis of the opening information 23 whether the road of the link information 22 is unopened (step S2). If the road of the link information 22 is not unopened (No in step S2), the navigation processing unit 30 proceeds with the processing using the link information 22 (step S3). On the other hand, if the road of the link information 22 is unopened (YES in step S2), the navigation processing unit 30 transmits an opening situation check request for the link information 22 to the map-data-access control unit (step S4).

When receiving the opening situation check request for the link information 22, the map-data-access control unit 31 searches through the reference table 16 using the link information 22 as a search key in order to determine whether the link information 22 is recorded in the reference table 16 (step S5). If the relevant link information 22 is found (YES in step S6), the map-data-access control unit 31 acquires the road number 25 of the road corresponding to the link information 22 (step S7). The map-data-access control unit 31 searches through the storing unit 10 to find the opening flag file 17 including the road number 25 (step S8).

If the opening flag file 17 is found (YES in step S9), since the road of the road number 25 is opened, the map-data-access control unit 31 replies to the navigation processing unit 30 to the effect that the road is "opened" (step S10). When receiving the reply of "opened", the navigation processing unit 30 directly proceeds with the processing using the link information (step S11).

On the other hand, if the opening flag file 17 is absent (NO in step S9), since the road of the road number 25 remains unopened, the map-data-access control unit 31 replies to the navigation processing unit 30 to the effect that the road is "unopened" (step S12). When receiving the reply of "unopened", the navigation processing unit 30 proceeds with the processing without using the link information 22 (step S13).

If the relevant link information 22 is not found in the search through the reference table 16 in step S5 (NO in step S6), this indicates that opening/unopening is not managed by the navigation device 1. Therefore, in this case, the map-data-access control unit 31 replies to the navigation processing unit 30 to the effect that the road is "unopened" in order to prohibit use of the link information 22 whose opening is uncertain.

Figure 6:
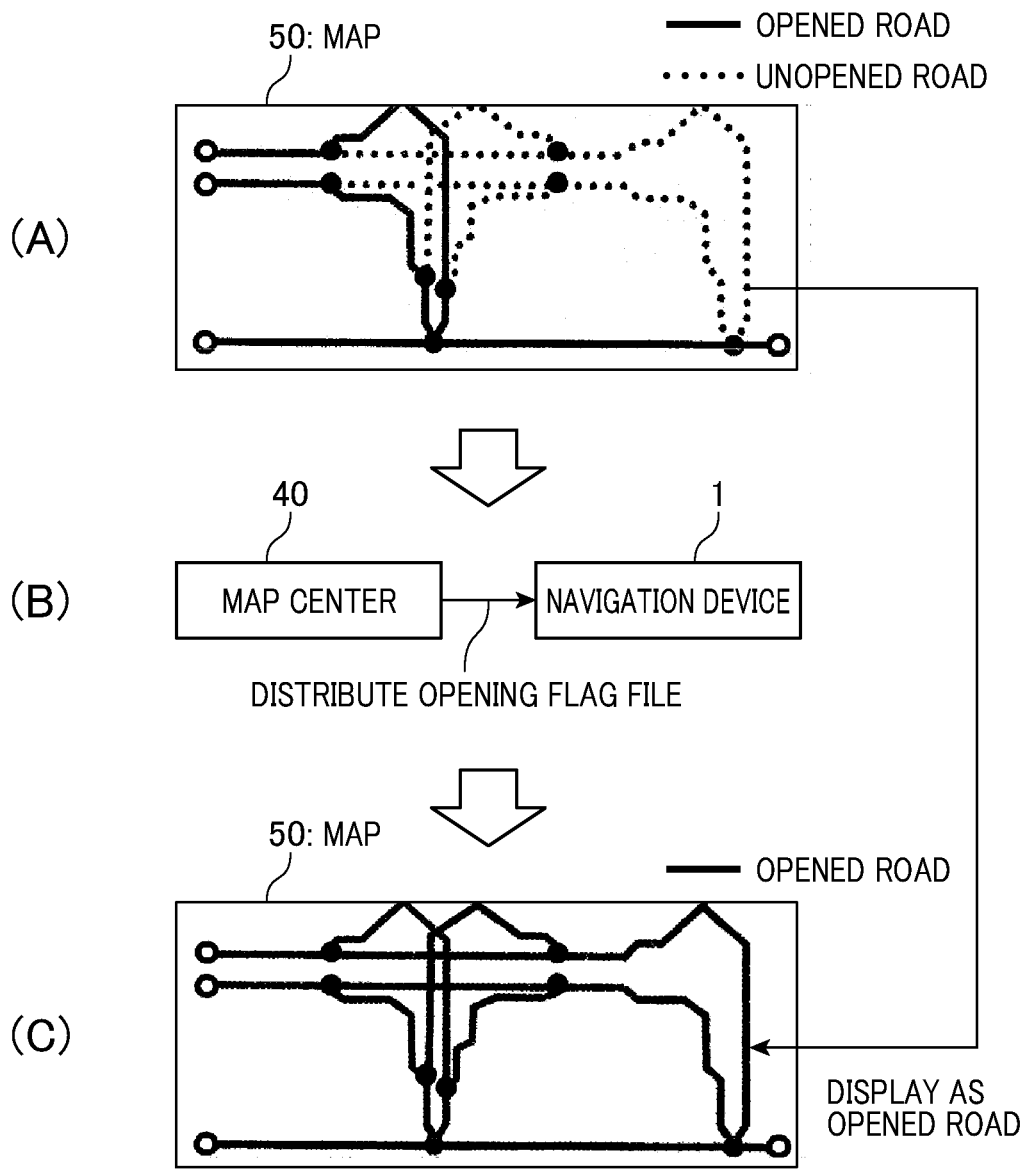
FIG. 6 is an operation explanation diagram of the navigation device.

FIG. 6 is an operation explanation diagram of the navigation device 1.

During manufacturing and shipment or during a start of use of the navigation device 1, the map data 20 served for navigation is stored in the storing unit 10. In the map data 20, as explained above, in addition to actually opened roads, unopened roads before being opened at a recording point in time of the map data 20 are included. As explained above, opening/unopening of all the roads is distinguished in advance by attaching the opening information 23 indicating opening/unopening to all the link information 22 of the map data 20. In the unopened road avoidance processing of the route guidance or the like, the unopened roads are not used. Therefore, for example, when a map 50 based on the map data 20 is displayed on the display unit 13 in this processing, as shown in FIG. 6(A), only opened roads (in the figure, solid lines) are displayed and unopened roads (in the figure, imaginary lines) are not displayed.

When the unopened roads are actually opened, as shown in FIG. 6(B), the opening flag file 17 indicating the opening of the roads is distributed from a distribution server on the outside such as the map center 40 and stored in the storing unit 10 through the acquiring unit 11.

As a result, in the unopened road avoidance processing, even if the opening information 23 of the road of the map data 20 indicates unopening, since the opening flag file 17 is stored in the storing unit 10, it is determined that the road is "opened" in the processing shown in FIG. 5. Consequently, as shown in FIG. 6(C), in the map display of the display unit 13, the roads unopened in the opening information 23 of the map data 20 (in FIG. 6(A), the imaginary lines) are displayed and used for the route guidance or the like.

According to the embodiment explained above, effects explained below are achieved.

That is, according to this embodiment, the opening flag file 17 indicating that an unopened road is opened is stored in the storing unit 10 separately from the map data 20. Opening of an unopened road included in the map data 20 is determined on the basis of whether the opening flag file 17 corresponding to the unopened road is stored.

Consequently, since it is unnecessary to change the map data 20 according to the opening of the unopened road, it is possible to avoid a situation in which the map data 20 cannot be used while the change is performed. It is possible to accurately inform the user of the road opened to be usable. Since the change of the map data 20 is unnecessary, there is no concern about damage to the map data 20 either.

According to this embodiment, the opening flag file 17 is configured to be individually stored in the storing unit 10 for each of opened roads.

Consequently, if by any chance treatment as the opened road is cancelled, simply by deleting the opening flag file 17 corresponding to the road, it is possible to individually cancel the treatment without affecting opening of the other roads. Since the map data 20 is not changed, maintenance is extremely easy.

According to this embodiment, the opening information 23 for distinguishing opening and unopening of roads is included in the map data 20. Therefore, the processing unit 12 can easily distinguish opening and unopening of the roads on the basis of the opening information 23. When the opening flag file 17 of an unopened road is stored, the processing unit 12 treats the unopened road as an opened road and executes processing related to navigation. Therefore, it is possible to perform accurate navigation reflecting opening of the unopened road even if the map data 20 is not changed.

Note that the embodiment explained above only illustrates a mode of implementation of the present invention. Modification and application of the embodiment are optionally possible in a range not departing from the spirit of the present invention.

Figure 7:
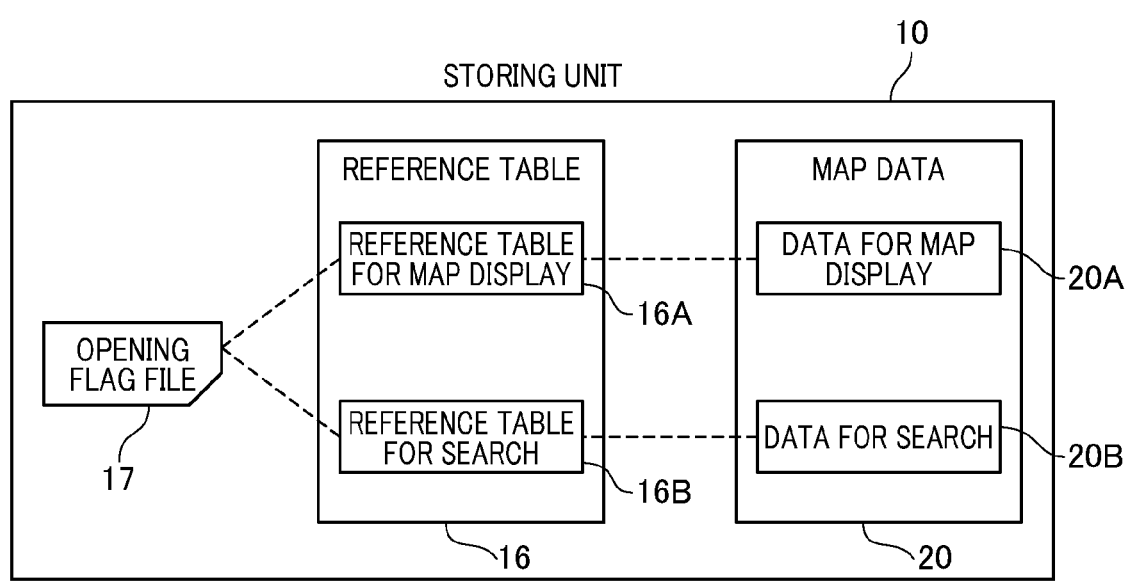
FIG. 7 is an explanatory diagram showing map data and a reference table according to a modification of the present invention together with a storing unit.

For example, in the embodiment explained above, as shown in FIG. 7, the map data 20 may be configured to be stored in the storing unit 10 while being divided into data for map display 20A and data for search 20B. The data for map display 20A is data including information necessary for displaying a map. The data for search 20B is data including information necessary for route search processing. In this case, the reference table 16 includes a reference table for map display 16A corresponding to the data for map display 20A and a reference table for search 16B corresponding to the data for search 20B.

Even when the map data 20 is divided into the data for map display 20A and the data for search 20B for each of the map display processing and the route search processing in this way, one opening flag file 17 is stored in the storing unit 10 concerning an opening situation of the same road (route). The opening flag file 17 is associated with each of the reference table for map display 16A and the reference table for search 16B. Consequently, irrespective of which data of the data for map display 20A and the data for search 20B is used, an opening situation (unopened/opened) of roads is appropriately reflected.

Note that the reference table 16 is not limited to the configuration including the reference table for map display 16A and the reference table for search 16B. The reference table 16 common to the data for map display 20A and the data for search 20B may be configured.

For example, in the embodiment explained above, the map center 40 may transmit information including a road number of an actually opened road to the navigation device 1 instead of transmitting the opening flag file 17. The processing unit 12 of the navigation device 1 may generate the opening flag file 17 on the basis of the information and cause the storing unit 10 to store the information. The navigation device 1 may acquire the information including the road number of the actually opened road from a recording medium such as an optical disk in which the information is recorded, generate the opening flag file 17, and store the opening flag file 17.

For example, in the embodiment explained above, the opening flag file 17 may be provided for each link information 22 of an opened road. Whether the road indicated by the link information 22 of unopening included in the map data 20 is opened may be determined on the basis of whether the opening flag file 17 of the link information 22 is stored. With this configuration, it is possible to determine whether the road indicated by the link information 22 is opened without using the reference table 16.

For example, in the embodiment explained above, only the link information 22 of an opened road may be recorded in the reference table 16. Whether the road indicated by the link information 22 of unopening included in the map data 20 is opened may be determined on the basis of whether the link information 22 is recorded in the reference table 16. With this configuration, it is unnecessary to store all of the opening flag files 17 acquired from the outside. It is possible to determine opening only referring to the reference table 16.

For example, in the embodiment explained above, an unopening flag file indicating a road unopened because of a reason such as route discontinuation or construction may be stored in the storing unit 10 as information indicating an opening situation of the road. Unopening may be determined on the basis of whether the unopening flag file is stored in the storing unit 10 for the roads of the map data 20. In the unopening flag file, as in the opening flag file 17, data including at least the road number 25 of an unopened route or the link information 22 of the route can be used.

With this configuration, it is possible to easily reflect an actually unopened road on processing even if the map data 20 is changed. When the unopened road is actually opened again, in the navigation device 1, the unopening flag file only has to be deleted even if the map data 20 is not changed. Therefore, it is extremely easy to reflect unopening/reopening of a road.

For example, in the embodiment explained above, information concerning a period (e.g., date and time) when opening of a road is planned may be included. In this case, the navigation device 1 includes a GPS receiving unit including, for example, a circuit that receives a GPS signal. The processing unit 12 calculates present date and time on the basis of the GPS signal received by the GPS receiving unit and determines on the basis of the present time and the information concerning the period when the opening is planned of the opening flag file 17 acquired by the acquiring unit 11 whether the road is actually opened.

For example, in the embodiment explained above, the opening flag file 17 is generated every time an opening situation of one route changes and distributed to the navigation device 1. However, the present invention is not limited to this.

That is, data indicating changes in opening situations of a plurality of routes (hereinafter referred to as "opening situation file") may be periodically or non-periodically generated and distributed to the navigation device 1.

Figure 8:
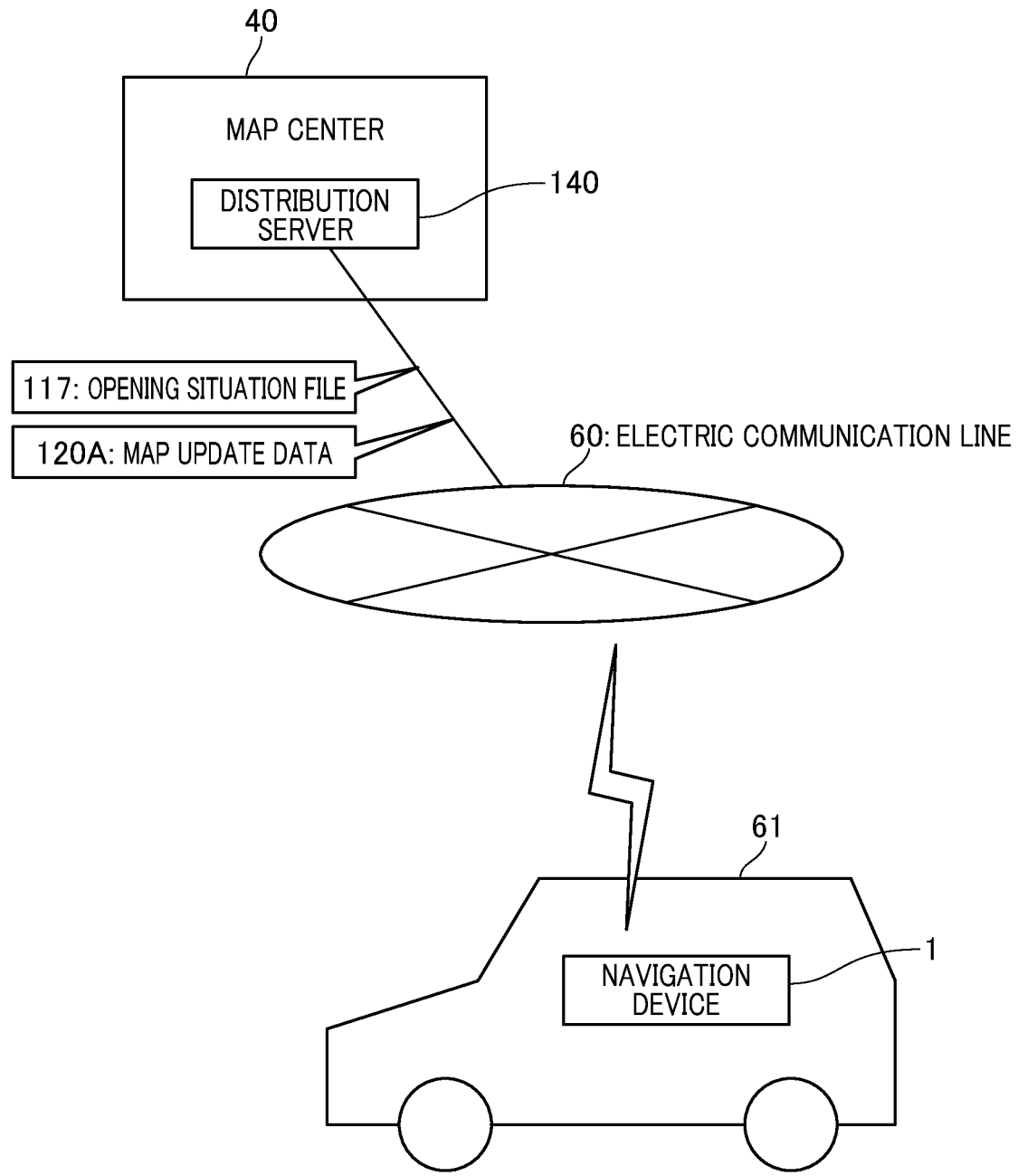
FIG. 8 is a diagram showing the configuration of a distribution system according to a modification of the present invention.

FIG. 8 is a diagram showing the configuration of a distribution system 100 according to this modification.

The distribution system 100 is a system that periodically distributes an opening situation file 117 and map update data 120A to the navigation device 1. As shown in FIG. 8, the distribution system 100 includes a distribution server 140 provided in the map center 40 and the navigation device 1 mounted on a vehicle 61. The distribution server 140 and the navigation device 1 communicate with each other via an electric communication line 60. The opening situation file 117 and the map update data 120A are distributed by the communication.

The electric communication line 60 includes a fixed communication network such as the Internet and a mobile communication network such as a cellular phone network or a wireless LAN. The distribution server 140 is connected to the fixed communication network. During vehicle traveling, the navigation device 1 communicates with the distribution server 140 through the mobile communication network. For the communication between the navigation device 1 and the mobile communication network, a cellular phone such as a smart phone can also be used as a repeater.

The opening situation file 117 is a data file generated in every predetermined opening situation distribution period (e.g., one month). In the opening situation file 117, information concerning routes in which opening situations change during the opening situation distribution period is recorded. In other words, the opening situation file 117 is equivalent to a data file in which the opening flag file 17 explained in the embodiment is recorded as many as the routes in which the opening situations change during the opening situation distribution period.

When the opening situation file 117 is distributed to the navigation device 1, the opening situation file 117 is distributed with a predetermined name (e.g., "AAA.dat") attached to a name (hereinafter referred to as "file name") attached to identify data of the opening situation file 117. Since the file name is unified, during operation verification work such as during manufacturing and shipment of the navigation device 1, the operation verification work only has to be performed on data of the predetermined file name. It is easy to perform the operation verification work compared with when the file name is unspecified.

The map update data 120A is data for reflecting actual situations of roads at a distribution point in time on the map data 20 stored in the navigation device 1. The map update data 120A is generated in every predetermined map update period (e.g. one year) and distributed to the navigation device 1. Specifically, in the map update data 120A, the road information 21 concerning a road in which a change occurs in the map update period is included.

The navigation device 1 updates the map data 20 on the basis of the road information 21 of the map update data 120A. Therefore, the map data 20 reflects the actual situation of the road at the distribution point in time. For example, information concerning a road in which an opening situation changes in the map update period and a road in which construction is planned anew are reflected on the map data 20.

The opening situation distribution period of the opening situation file 117 is set to a period shorter than the map update period of the map update data 120A. In the map update period (e.g., one year) of the map update data 120A, the opening situation file 117 is distributed a plurality of times targeting the map data 20 updated with the map update data 120A.

In the distribution system 100, the map update data 120A and the opening situation file 117 are generated in the map center 40 and distributed by the distribution server 140

Note that a form of the distribution of the map update data 120A and the opening situation file 117 may be either push distribution or pull distribution.

FIG. 9 is a schematic diagram of the opening situation file 117.

As shown in the figure, in the opening situation file 117, the road name 26, an opening situation 62, and an opening scheduled date 63 are recorded in association with one another for each of the road numbers 25.

As in the opening flag file 17 shown in FIG. 4, the road number 25 indicates a route of a road and the road name 26 indicates a name of the road.

The opening situation 62 indicates an opening situation of the route at the distribution point in time. When an unopened route is opened, the opening situation 62 of the road changes to "opened". Conversely, when an opened route is unopened, the opening situation 62 of the route changes to "unopened". When a route scheduled to be opened is generated anew at the distribution point in time, the opening situation 62 of the route changes to "unopened".

The opening scheduled date 63 indicates a scheduled date of opening of the route. Note that the opening scheduled date 63 does not indicate a schedule ahead of a distribution date of the opening situation file 117 and simply indicates the scheduled date of the opening of the route irrespective of the distribution date. For example, when opening of a route is scheduled in a date before the distribution point in time of the opening situation file 117 (including when the route is actually opened), the opening scheduled date 63 of the route is a date before the distribution date.

In the opening situation file 117, not only information concerning a route in which an opening situation changes during the opening situation distribution period of this time but also information concerning a route in which an opening situation changes after the map update data 120A is distributed is accumulatively recorded.

Consequently, in the navigation device 1, if distribution of the opening situation file 117 nearest in time is received, even if the opening situation file 117 of every time distributed in every opening situation distribution period is not received, it is possible to acquire all opening situations of routes up to an opening situation of the last time in addition to an opening situation of this time. The distribution server 140 does not need to manage the opening situation file 117 received by the navigation device 1.

When receiving the opening situation file 117 from the distribution server 140, the navigation device 1 stores the opening situation file 117 in the storing unit 10. In the storage, when the opening situation file 117 distributed last time is present in the storing unit 10, the navigation device 1 replaces the opening situation file 117 of the storing unit 10 with data received this time by, for example, overwriting the opening situation file 117 with the opening situation file 117 received this time.

During the execution of the navigation processing, the navigation device 1 performs a route search and route guidance (guiding) excluding routes whose opening situations are "unopened" (that is, using routes whose opening situations are "opened") among the routes recorded in the map data 20.

Specifically, the navigation device 1 determines, for each of routes (links) referred to in the map data 20, whether a change in an opening situation of the route is recorded in the opening situation file 117.

Concerning a route for which a change of an opening situation is recorded in the opening situation file 117, the navigation device 1 specifies on the basis of the opening situation 62 and the opening scheduled date 63 of the opening situation file 117 and the present date whether the route is opened.

On the other hand, concerning a route for which a change of an opening situation is not recorded in the opening situation file 117, the navigation device 1 specifies on the basis of the opening information 23 of the road information 21 whether the route is opened.

In this way, the navigation device 1 specifies whether each of the routes referred to in the map data 20 is opened and performs the route guiding excluding routes not opened.

Note that, in the route guiding, when displaying a map based on the map data 20 on the display unit 13, the navigation device 1 may include unopened routes (roads) in the map and display the unopened routes. However, the unopened routes are desirably displayed while being attached with an identifier (characters, a sign, etc.) for enabling the user to identify the routes as unopened.

In the distribution system 100 according to this modification, as shown in FIG. 10, the opening situation file 117 may be configured to include information concerning only routes already opened and not to include information concerning routes not opened at the distribution point in time (that is, scheduled to be opened in future).

With this configuration, simply by determining whether a route referred to in the map data 20 is included in the opening situation file 117, the navigation device 1 can specify that the route is opened without confirming that the route is not unopened referring to the opening situation 62 of the route. Consequently, in the navigation processing, time required for the route search is reduced.

Note that, in FIG. 10, a configuration in which the opening situation file 117 includes the opening situation 62 is shown. However, in the case of a configuration in which the opening situation file 117 does not include information concerning routs not opened at the distribution point in time, the opening situation file 117 does not need to include the opening situation 62.

In the embodiment explained above, information indicating a change in an opening situation of a road (a route) included in the map data 20 is included in the opening flag file 17 or the opening situation file 117 and distributed to the navigation device 1. However, not only the information concerning the change in the opening situation of the road included in the map data 20 but also information indicating a change in, for example, a POI (Point of interest) included in a map (hereinafter referred to as "POI change information") may be distributed to the navigation device 1. When referring to the POI included in the map data 20, the navigation device 1 specifies a change in the information concerning the POI on the basis of the POI change information. Examples of the information indicating the change in the POI include store opening information and store closing information, bargain sale information, and campaign information of a facility, a store, and the like.

In the embodiment explained above, the application of the present invention to the navigation device 1 is illustrated. However, the present invention is not limited to this. The present invention can also be applied to information processing for executing various kinds of processing on the basis of the map data 20 including the information concerning the roads. Further, the present invention can also be applied to a map display device including the information processing device and a display unit that displays a map based on processing by the information processing device.

REFERENCE SIGNS LIST

1 navigation device (information processing device)
10 storing unit
11 acquiring unit
12 processing unit
13 display unit
15 map database
16 reference table
17 opening flag file
20 map data
21 road information
22 link information
23 opening information
30 navigation processing unit
31 map-data-access control unit
60 electric communication line
100 distribution system
117 opening situation file
120A map update data
140 distribution server

The invention claimed is:

1. An information processing device comprising:
a storing unit including one of a storage device and a memory device to store map data including opened roads, which are opened at a point in time of creation of the map data, and unopened roads;
a processor connected to the storing unit to perform at least one of display of the map and a search for a route on a basis of the map data stored in the storing unit; and
an acquiring unit including a communication device connected to at least one of an electric communication line and a reading device to acquire an opening data file, which indicates an opening situation of a road,
wherein the storing unit stores, separately from the map data, the opening data file acquired by the communication device of the acquiring unit,
when the opening data file, which indicates that one of the unopened roads is opened, is stored in the storing unit, without changing the map data in the storing unit, the processor performs at least one of the display of the map and the search for a route on the basis of the opened roads of the map data, which are opened at the point in time of creation of the map data, and the one of the unopened roads, which is opened and indicated by the opening data file, stored in the storing unit, and when the opening data file, which indicates that one of the unopened roads is opened, is absent in the storing unit, without changing the map data in the storing unit, the processor performs at least one of the display of the map and the search for a route on the basis of the opened roads of the map data, which are opened at the point in time of creation of the map data, stored in the storing unit.

2. The information processing device according to claim 1, wherein the storing unit stores, on the basis of the opening data file acquired by the acquiring unit, information indicating that an unopened road is opened.

3. The information processing device according to claim 1, wherein the storing unit stores, on the basis of the opening data file acquired by the acquiring unit, information indicating that an opened road is unopened.

4. The information processing device according to claim 1, wherein the storing unit stores, according to a route of a road, information indicating that an opened road is unopened.

5. An information processing method of an information processing device, the information processing method comprising the steps of:

storing, in a storing unit including one of a storage device and a memory device, map data including opened roads, which are opened at a point in time of creation of the map data, and unopened roads;

performing at least one of display of the map and a search for a route on a basis of the map data by a processor connected to the storing unit;

acquiring an opening data file, which indicates an opening situation of a road, to an acquiring unit, which includes a communication device connected to at least one of an electric communication line and a reading device, and transmitting the opening data file to the storing unit; and storing, separately from the map data, the opening data file in the storing unit, the opening data file acquired by the step of acquiring, wherein when the opening data file, which indicates that one of the unopened roads is opened, is stored in the step of storing, without changing the map data in the storing unit, the step of performing includes performing at least one of the display of the map and the search for a route by the processor on the basis of the opened roads of the map data, which are opened at the point in time of creation of the map data, and the one of the unopened roads, which is opened and indicated by the opening data file, stored in the storing unit, and when the opening data file, which indicates that one of the unopened roads is opened, is absent in the step of storing, without changing the map data in the storing unit, the step of performing includes performing at least one of the display of the map and the search for a route by the processor on the basis of the opened roads of the map data, which are opened at the point in time of creation of the map data, stored in the storing unit.

6. The information processing method according to claim 5, wherein, in the step of storing, information indicating that an unopened road is opened is stored on the basis of the opening data file acquired by the step of acquiring.

7. The information processing method according to claim 5, wherein, in the step of storing, information indicating that an opened road is unopened is stored on the basis of the opening data file acquired by the step of acquiring.

8. The information processing method according to claim 5, wherein, in the step of acquiring, information indicating that an opened road is unopened is stored according to a route of a road.

* * * * *